Feb. 26, 1957 H. L. LESIGNE 2,783,306

TELEPHONE CONNECTIONS FOR PARTY LINES

Original Filed Aug. 6, 1948 2 Sheets-Sheet 1

INVENTOR
HENRI LOUIS LESIGNE
BY Paul M. Craig, Jr.
ATTORNEY.

INVENTOR
HENRI LOUIS LESIGNE
BY Paul M. Craig, Jr.
ATTORNEY.

United States Patent Office

2,783,306

Patented Feb. 26, 1957

2,783,306

TELEPHONE CONNECTIONS FOR PARTY LINES

Henri Louis Lesigne, Vanves, France, assignor to Compagnie Industrielle des Telephones, Paris, France, a corporation of France Continuation of application Serial No. 42,890, August 6, 1948. This application September 8, 1952, Serial No. 308,371

Claims priority, application France August 7, 1947

8 Claims. (Cl. 179—17)

This is a continuation of my co-pending patent application Serial No. 42,890 filed August 6, 1948, and now abandoned.

In the usual types of telephone systems each subscriber's station is connected to the exchange by a line which is allocated to him alone. There are thus as many lines as there are subscribers' stations to be served.

Such systems are disadvantageous when the subscribers served make few calls.

The object of the present invention is to provide an arrangement making it possible to connect several subscribers' stations to an exchange by means of lines fewer in number than the number of stations.

The stations connected in this way are preferably located in a limited area; for example, all the infrequently used subscribers' stations in the same building may be connected in this way to the same exchange.

The system according to the present invention comprises in known manner an exchange, a switching centre and at least one junction between the exchange and the centre, the centre comprising a switch to whose contacts the different subscribers' lines are connected and the exchange comprising a second switch which constantly occupies a position corresponding to that of the first switch, so that the same operations take place at the exchange as if the different subscribers' lines were directly connected thereto.

An object of this invention is to provide an efficient and simple means for achieving this result.

The attached drawings respectively represent the various parts of the system according to the invention.

Figure 4:
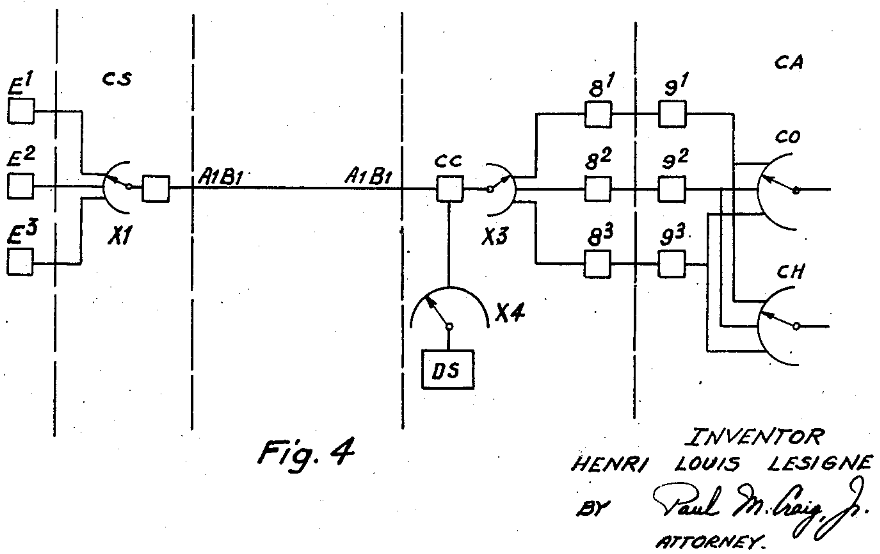
Fig. 4 is a diagram of the whole of the system, permitting a better understanding of its operation.

First referring to Figure 4, there is shown an exchange CA, which may be of any system, and comprises linefinders CH, connectors CO, and two relays for each subscriber, one being a cut-off relay and the other a test-wire relay. These two relays are shown at $9^1$ and $8^1$, $9^2$ and $8^2$, $9^3$ and $8^3$ for three subscribers respectively, whose stations are connected to this exchange over the switching centre.

In the vicinity of the exchange is situated a switch X3 associated with a connecting circuit CC and a control circuit DS hunting for the connecting circuit by means of a finder X4.

At the end of the junction A1, B1 and relatively near the subscriber's stations E1, E2, E3, is placed the switching centre CS, comprising a switch X1, whose individual contacts are respectively connected to the subscribers' lines leading to the stations E1, E2 and E3.

The operation of the system will now be described.

Two cases have to be considered, according to whether the subscriber is making a call to the exchange, or whether he is receiving a call.

1. *The subscriber is making a call*

Figure 1:
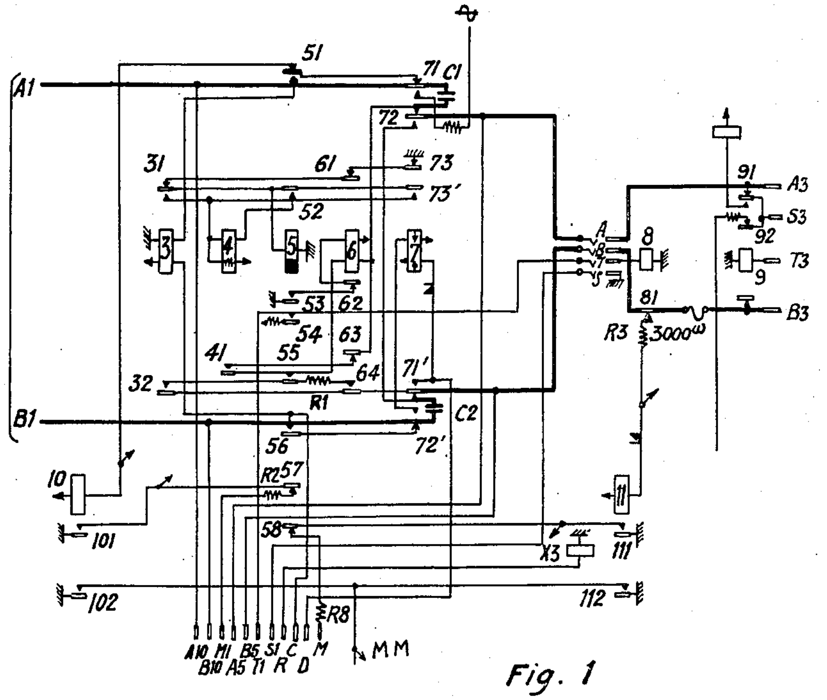
Fig. 1 represents the connecting circuit attached to each junction at the exchange end.
Figure 2:
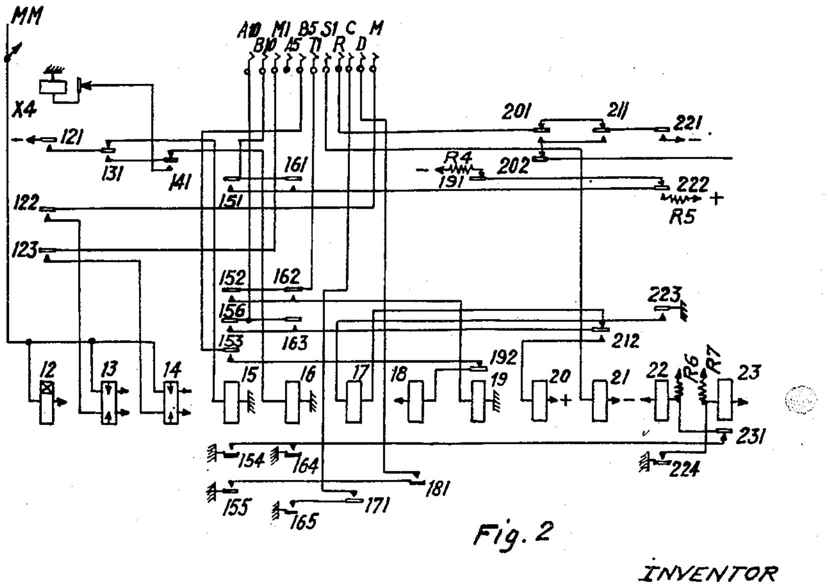
Fig. 2 represents one of the control circuits located in the exchange.
Figure 3:
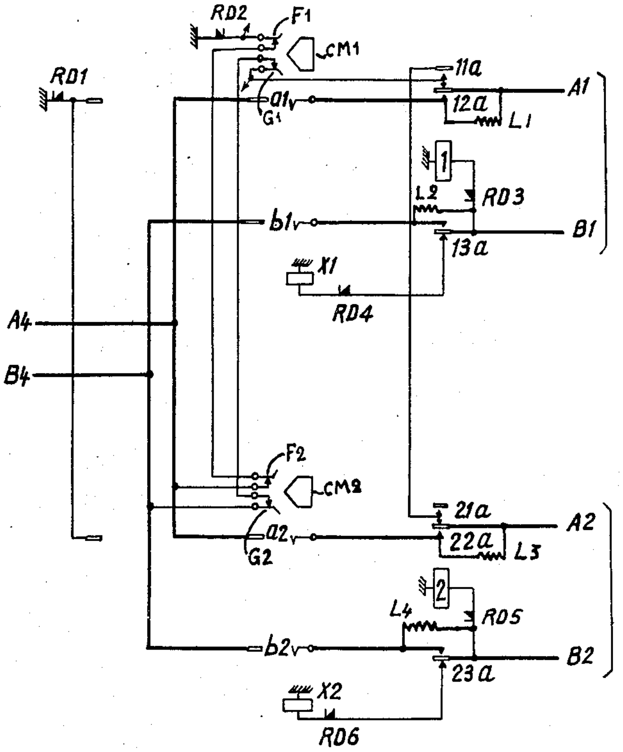
Fig. 3 represents parts of the switching centre assumed to be connected to the exchange by two junction lines, only the line connecting the switching centre with one subscriber having been represented.

When the subscriber of line A, B, Fig. 3, removes his receiver, a potential approximately that of earth is applied to the wire A1 of the junction. Assuming that the first switch X1 of the switching centre lies on a position other than that corresponding to the calling subscriber, the circuit is as follows: Earth, rectifier RD2 in the direction allowing the passage of current, made contacts F1 of X1 and F2 of X2 in series, wire A4, subscriber's loop, wire B4, made contacts G2 of X2 and G1 of X1 in series, 11*a*, wire A1 of the junction, back contact 71 in the connecting circuit, back contact 51, relay 10, —.

Each of the contacts F1, G1, F2 and G2 consists of two springs. CM1 and CM2 are two cams made of an insulating substance and carried along with the wipers of X1 and X2 respectively. Cam CM1 is inserted between the two external springs of contacts of F1 and G1. These springs are pushed aside and the two contacts are therefore opened on the position assumed by the wipers of X1. The same applies to cam CM2 with respect to switch X2. Thus relay 10 is not energized over the circuit above traced when switch X1 lies on the position corresponding to the calling subscriber when he makes a call. In that case the earth is applied to the wire A1 over: relay 1, rectifier RD3, resistance L2, wiper *b1*, calling subscriber's loop, wiper *a1* and resistance L1.

There is one relay 10 provided for each switching centre.

The relay 10 starts the control circuit through: Earth, 102, wire MM, relay 12, —.

The relay 12 is energized, and the relays 13 and 14 are also energized over their upper windings. Moreover, relay 10 applies an earth to contact M1 of the connecting circuit of each of the two junctions of the switching centre if both are idle:

Earth, 101, 57, resistance R2, contact M1 of the switch X4.

Contact 101 is multipled to the contact 57 of each of the two connecting circuits.

The driving circuit of the switch X4 is established through:

Earth, driving electromagnet of X4, its circuit-breaker, front contact 141, 131, 121, —.

When the wiper M1 of X4 passes on the contact M1 connected to a connecting circuit of an idle junction A1, B1, the lower winding of relay 14 is energized:

Earth, 101, 57, resistance R2, contact and wiper M1, 123, lower winding of relay 14, —.

The relay 14, having its two windings in opposition, falls back and opens at its front contact 141 the driving circuit of X4.

The relay 16 is energized:

Earth, winding of 16, 141, 131, 121, —.

Relay 22 is energized:

Earth, 164, 231, relay 22, —.

Relay 23 is energized through:

Earth, 224, relay 23, —. It opens at 231 the circuit of relay 22, which is released.

The relay 22 opens at 224 the circuit of 23, which is released and re-establishes the energization of 22 over 231.

The two relays 22 and 23 thus beat alternately. At each beat of 22 the rotary switches X1 and X3 advance one step. The operation is as follows:

When relay 22 is operated, the driving electromagnets of X1 and X3 are energized:

Earth, electromagnet X3, contact and wiper R of X4, 201, 211, 221, —, for X3, and +, resistance R5, 222, 161, wiper and contact B10, wire B1 of the junction, 13*a* in the switching centre, rectifier RD4 in the direction allowing the passage of current, electromagnet X1, earth for X1.

When the relay 22 falls back, the electromagnets X1 and X3 are no longer energised, the switches advance one step.

The relay 1 is energized:

Earth, relay 1, rectifier RD3 in the direction allowing the passage of current, wire B1, contact and wiper B10 of X4, 161, back contact 222, 191, resistance R4, —.

X1 cannot be energized, since the rectifier RD4 does not allow the passage of current through X1.

The relays 22 and 23 continue to beat and thus step the switches X1 and X3.

The relay 1 is energized by the negative polarity after each step of X1, and falls back owing to the presence of the rectifier RD3 when connected to the positive polarity which energizes X1.

There is reserved on each of the switches X1 and X3 a position on which there is an earth on the contact *a*1 of X1 and an earth on the contact S3 of X3. This position is intended to check the correspondence of position between the two switches.

If one of them is accidentally displaced with respect to the other, the control circuit restores it to the corresponding position during the rotation.

If X3 arrives before X1 on its checking position, relay 21 is energized:

Earth, wiper S of X3, contact and wiper S1 of X4, relay 21, —, and cuts off at back contact 211 the rotation of X3, X1 continuing to rotate through front contact 222.

When X1 arrives in its turn on its checking position, relay 20 is energized through:

+, relay 20, 212, 163, wiper and contact A10 of X4, wire A1 of the junction, front contact 12*a*, wiper *a*1 of X1 contact *a*1 of the checking position, rectifier RD1 in the direction allowing the passage of current, earth.

The rotation of X3 is re-established through front contacts 201 and 211, that of X1 continues, and relays 21 and 20 are released.

If X1 passes over its checking position before X3 it proceeds further simultaneously with X3, and when X3 later passes on its checking position, it will, as just explained wait until X1 in its turn passes on its checking position.

When X1 reaches the position corresponding to the calling subscriber, relay 17 is energized over the subscriber's loop:

Earth, 223, relay 17, 212, 163, wiper and contact A10 of X4, wire A1, front contact 12*a*, wiper *a*1 of X1, wire A4, subscriber's loop, wire B4, wiper *b*1 of X1, 13*a*, wire B1, contact and wiper B10, 161, 222, resistance R5, +.

When X1 reaches the position corresponding to the calling subscriber, contacts F1 and G1 are opened, as explained above.

Relay 3 is energized through:

Earth, 165, 171, wiper and contact C of X4, lower winding of 3, —;

The relay 5 is then energized:

Earth, relay 5, front contact 31, (lower) winding of 4, —;

The relays 8 and 19 are also energized through:

Earth, relay 8, wiper T of X3, 54, resistance, —, and earth, relay 19, 162, wiper and contact T1 of X4, 54, resistance, —.

The relay 1 is held on the wire B1 through: back contact 72', 56, relay 3, —.

On the calling subscriber's position of switch X1, the relay 1 remains energized and therefore both back contacts 12*a*, 13*a* are opened as is also back contact 51, since relay 5 has been energized.

The relay 10 falls back.

Relays 12, 13 and 14 fall back by the opening of 102, as also the relay 16 by the opening of 121.

The control circuit is released and is thus available for a new call.

The connecting circuit establishes the loop, in the same manner as if the subscriber were directly connected to the exchange:

Wire A3, wiper A of X3, back contact 72, lower winding of 6, 55, 32, wiper B of X3, wire B3.

When the exchange has responded to the call, it feeds the line by means of an earth on the wire B3 and a minus polarity on the wire A3.

The lower winding of 6 is energized, but 6 is not operated, as its upper winding is also energized, and in opposition to the first through:

Earth, 53, 62, upper winding of relay 6, —.

When the subscriber hears the dialling tone sent out by the exchange, he dials the desired number.

The relay 3 beats as the result of the impulses sent on the line by the dialling.

Upon the first line opening taking place in the train of impulses, the relay 4 is energized:

Earth, relay 5, 52, the two windings of 4 in series, — and short-circuits through 41 the lower winding of relay 6, which however does not operate, because it operates only when current simultaneously flows through both its windings in suitable directions.

When relay 3 is re-energized after the first impulse, the upper winding of 4 is short-circuited over 52 and 31.

The relay 4 is slow to release, and the second line opening and consequently the release of relay 3, occur before relay 4 has released.

4 is thus held energized for the duration of the train of impulses.

The relay 3 periodically opens at 32 the loop to the exchange as the dialling is proceeding.

At the end of the impulse train, the relay 4 is short-circuited for a long time and therefore released.

At the moment when the calling subscriber is connected to the desired subscriber, the current supply of the calling subscriber is reversed.

There is then an earth on wire A3 and a negative polarity on the wire B3. The current is reversed in the lower winding of 6. The actions of the two windings are now additive, the relay 6 is energized and the loop is closed through 55, resistance R1 and 64.

At the end of the communication, when the two subscribers have hung up their receivers, the relay 3 falls back as it is no longer supplied with current. The relay 6, however, is held in series with the high value resistance R1.

The connecting circuit thus remains engaged until the release given by the exchange. The relay 6 then falls back either by cutting off the current supply to the line or by battery reversal.

The relay 5 is short-circuited for a long time through:

Earth, 73, 61, 31, and falls back.

The connecting circuit is released and can be again connected to the control circuit.

It has been assumed in the foregoing description that the junction A1B1 is free. If it were busy relay 1 would be energized, back contact 12*a* would be open and the energizing circuit of the starting relay 10 would be over wire A2, back contact 21*a* and front contact 11*a*, or in the event the initial orientation of switch X2 should correspond to the calling subscriber, over relay 2 and resistances L3 and L4.

An arrangement similar to that shown would also be possible in the case of three junctions or more.

There could be one junction A1B1 only. In that case contact F1 would be directly connected to wire A4 and contact G1 to wire B4. Nothing would be modified in the above described operation.

2. *The subscriber receives a call from the exchange*

The exchange applies an earth to the wire B3. The relay 11 is energized: ground on wire B3, 81, resistance R3, rectifier, relay 11, —.

Relay 11 is multipled to the contact 81 of each of the three relays $8^1$, $8^2$, $8^3$ corresponding to the three subscribers E1, E2 and E3 respectively. There is therefore one relay 11 for each switching centre.

The relay 11 starts the control circuit:

Earth, 112, wire MM, relay 12, —.

The relay 12 is thus energized as are also 13 and 14 over their upper windings.

Moreover, the relay 11 applies an earth on the contact M of the two connecting circuits corresponding to the two junctions respectively:

Earth, 111, 58, resistance R8, contact M of switch X4.

The driving circuit of X4 is established through:

Earth, electromagnet X4, its contact-breaker, 141, 131, 121, —.

When the wipers of X4 pass on to the position corresponding to an idle marked connecting circuit, the lower winding of relay 13 is energized:

Earth, 111, 58, resistance R8, contact and wiper M of X4, 122, relay 13, —.

The relay 13 then has its two windings in opposition, it falls back and opens the driving circuit of X4 by opening front contact 131.

The relay 15 is energized:

Earth, relay 15, 131, 121, —.

The relay 22 is energized through 154 and 231, and relays 22 and 23 begin to beat as in the previous case.

Upon each beat of relay 22, the switches X1 and X3 advance one step.

The setting in corresponding positions is effected in the same manner as has been stated above.

When the switch X3 reaches the position corresponding to the called subscriber, the relay 18 is energized:

Earth put on the wire B3 by the exchange, wiper B of X3, contact and wiper B5 of X4, 153, 192, relay 18, —.

The relay 7 is energized:

Earth, 155, 181, wiper and contact D of X4, unidirectional cell shown, lower winding of 7, —.

The relay 7 is held energized: —, lower winding of 7, 71', wire B and ground on wire B3.

The relay 1 remains energized through:

Wire B1, contact and wiper B10, 151, back contact 222, 191, resistance R4.

The relay 5 is energized:

Earth, relay 5, 73', non-inductive (lower) winding of 4, —.

The relays 8 and 19 are energized:

Earth, relay 8, wiper T, 54, resistance, —, and

Earth, relay 19, 152, wiper and contact T1 of X4, 54, resistance, —.

The relay 11 falls back by the opening of 81.

The relay 18 falls back by the opening of 192.

The relays 12, 13, 14 also fall back. The control circuit is released.

The ringing current is sent to the called subscriber's station through:

Front contact 71, wire A1, front contact 12*a*, wiper *a*1 of X1, wire A4 of subscriber's station, the ringing mechanism of the subscriber's station and its condenser, wire B4, wiper *b*1 of X1, 13*a*, wire B1, front contact 72', upper winding of 7, —.

When the subscriber removes his receiver, the loop is completed, the upper winding of 7, in opposition to the second winding, is fed with direct current.

Relay 7 falls back.

Relay 3 is energized:

Earth, upper winding of relay 3, 51, 71, wire A1, subscriber's station, wire B1, back contact 72', 56, lower winding of relay 3, —.

The relay 5 is held by over front contact 31.

The closing of 32 maintains the loop closed:

Wire A3, wiper A of X3, back contact 72, relay 6, 55, 32, wiper B of X3, wire B3.

At the end of the call, when the subscriber hangs up, the relay 3 falls back, being no longer energized, and opens the loop at 32.

The relay 5 is short-circuited for a long time through:

Earth, 73, 61, 31.

It therefore falls back, as does also the relay 8.

The connecting circuit is released and can be again engaged by the control circuit to serve another call.

What I claim is:

1. In a telecommunication system: an automatic switching exchange containing a first rotary switch having two brushes capable of rotating while constantly having the same orientation; a switching center containing a second rotary switch having two brushes capable of rotating while constantly having the same orientation; a two-wire junction connecting said automatic switching exchange with said switching center; in said switching center a ground connected to one wire of said junction and means for connecting said two junction wires to said two brushes of said second rotary switch respectively; in said automatic switching exchange means for generating pulses of alternating positive and negative polarities over said junction wire, and means for causing each of said switches to proceed one step for every succession of two successive pulses of opposite polarities.

2. A telecommunication switching center comprising: a relay having a winding, an armature, a corresponding front contact and a corresponding back contact, a junction wire connected to said armature, a rotary switch having a brush and a driving electromagnet having a winding, a connection between said brush and said front contact, a connection between ground and said junction wire over said winding of said relay and a first rectifier and a connection between ground and said front contact over said winding of said electromagnet and a second rectifier, the two rectifiers being so oriented that one of them allows the passage of current of one polarity occurring over said wire and the other rectifier allows the passage of current of the other polarity occurring over the same wire.

3. A telecommunication switching center comprising: a relay having a winding, a first armature, a corresponding first back contact, a corresponding first front contact, a second armature, a corresponding second back contact and a corresponding second front contact, a two-wire junction having a first and a second wire which are connected to said first and said second armatures respectively, a rotary switch having a driving electromagnet having a winding and a first and a second brush having constantly the same orientation, capable of hunting over a first and a second row of contacts respectively and connected to said first and second front contacts respectively, a plurality of two-wire subscribers' lines each of which has a first wire connected to a contact of said first row and a second wire connected to the contact of same orientation of said second row, a connection between said second back contact and said first line wire of each of said subscribers' lines and a connection, over a rectifier, between ground and said second line wire of each of said subscribers' lines.

4. A telecommunication switching center according to claim 3, comprising a connection between ground and said first junction wire over the winding of said relay and a rectifier which allows the passage of current occurring over said first junction wire which has the same polarity as that, flowing over a calling subscriber's closed loop, whose passage is allowed by said first mentioned rectifier.

5. A telecommunication switching center according to claim 3 comprising means for opening said last mentioned two connections for that subscriber's line whose line wires are connected to that pair of contacts on which said switch brushes are resting respectively, a connection, over a first resistance between said first brush and said first junction wire, and a connection, over a second resistance, between said second brush and said second junction wire.

6. A telecommunication switching center comprising: a relay having a winding, a first armature, a corresponding first back contact, a corresponding first front contact, a second armature, a corresponding second back contact and a corresponding second front contact, a two-wire junction having a first and a second wire which are respectively connected to said first and said second armatures, a rotary switch having a driving electromagnet having a winding and a first and a second brush having constantly the same orientation, capable of hunting over two rows of contacts respectively and connected to said first and second front contacts respectively, a plurality of two-wire subscribers' lines each of which has a first wire connected to a contact of said first row and a second wire connected to the contact of same orientation of said second row, a connection, over a first resistance, between said first brush and said first junction wire, a connection, over a second resistance, between said second brush and said second junction wire, a connection between said second back contact and said first line wire of each of said subscribers' lines, a connection, over a rectifier, between ground and said second line wire of each of said subscribers' lines, means for opening said last mentioned two connections for that subscriber's two-wire line whose line wires are connected to that pair of contacts on which said switch brushes are resting respectively, a connection between ground and said first junction wire over said winding of said relay and a second rectifier, a connection, between ground and said first back contact over said winding of said electromagnet of said switch and a third rectifier, the rectifiers being so oriented that a current pulse generated over said first junction wire may pass only either through said first and second or through said third rectifier.

7. A telecommunication system comprising: an automatic switching exchange; a switching center; a plurality of two-wire talking junctions connecting said automatic switching exchange with said switching center; in said switching center a rotary switch individual for each two-wire junction; in said switching exchange a rotary switch individual for each two-wire junction and a control circuit having means enabling to connect said control circuit to any one of said two-wire talking junctions and for sending current pulses over one wire of said two-wire junction; and cooperating means in said control circuit and in said switching center whereby said current pulses cause both switches to simultaneously proceed the same number of steps.

8. A telecommunication system as claimed in claim 7, in which said means for sending current pulses are means for sending pulses having alternately a positive and a negative polarity with respect to ground and said cooperating means in said switching center comprise two rectifiers respectively allowing the flow of current of positive and negative polarity.

References Cited in the file of this patent

UNITED STATES PATENTS

| | | |
|---|---|---|
| 1,899,014 | Christian et al. | Feb. 28, 1933 |
| 2,057,868 | Wochinger | Oct. 20, 1936 |
| 2,532,097 | Hersey | Nov. 28, 1950 |
| 2,542,079 | Grundin et al. | Feb. 20, 1951 |